Patented Jan. 6, 1925.

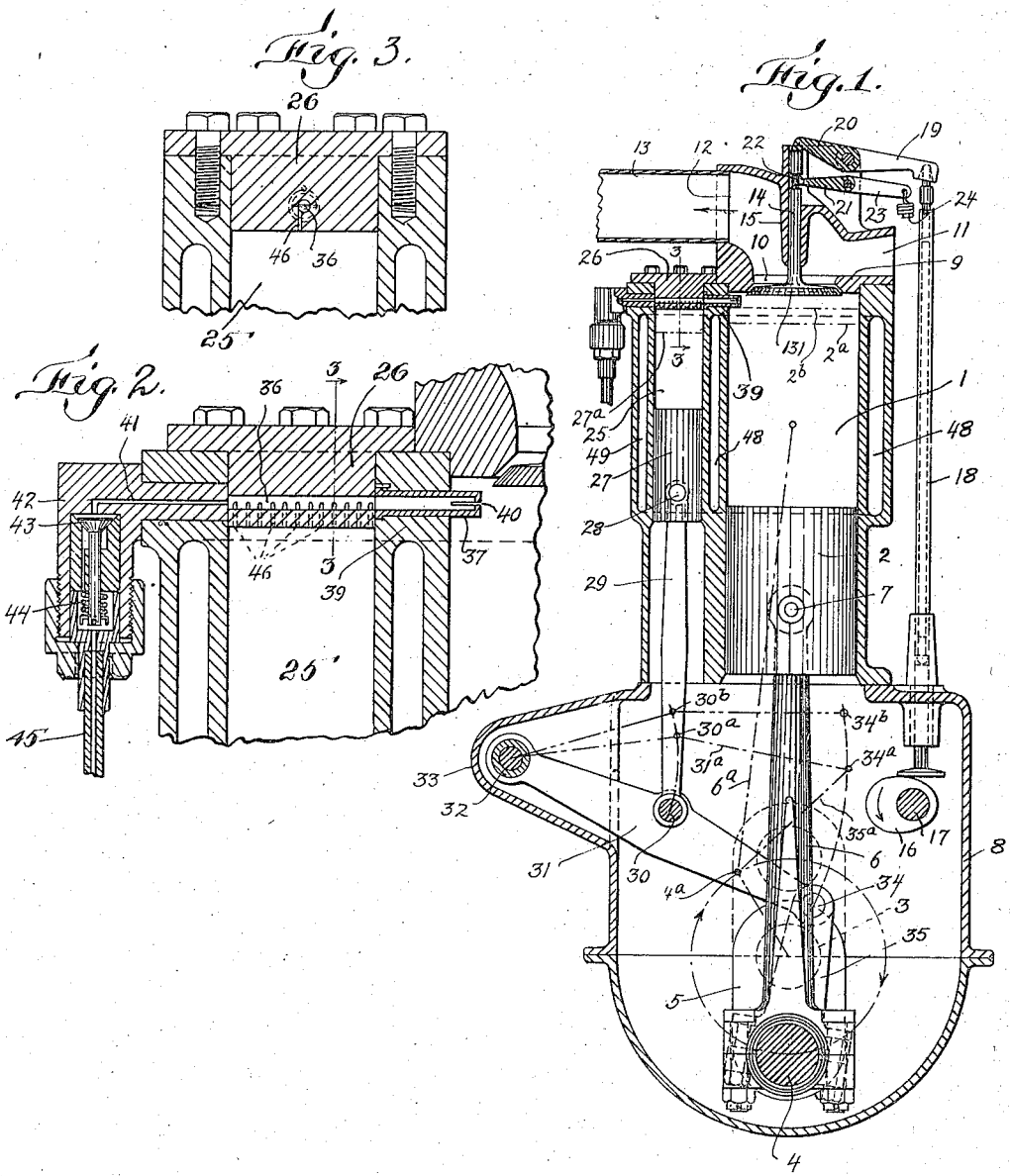

1,521,807

UNITED STATES PATENT OFFICE.

EUGENE A. FORD, OF NEWTON, MASSACHUSETTS, ASSIGNOR TO R. E. D. ENGINE COMPANY, INC., OF NEW YORK, N. Y., A CORPORATION OF NEW YORK.

INTERNAL-COMBUSTION MOTOR.

Application filed October 28, 1918. Serial No. 259,974.

*To all whom it may concern:*

Be it known that I, EUGENE A. FORD, a citizen of the United States, residing at Newton, in the county of Middlesex and State of Massachusetts, have invented new and useful Improvements in Internal-Combustion Motors, of which the following is a specification.

The present invention relates to internal combustion motors of the type using liquid fuel of the heavier and less volatile grades such as crude oil, fuel oil, kerosene, etc., and in which such fuel is ignited by heat developed by compression of a body of air in the combustion space of the motor. Among the objects of the invention are to provide a simple and effective means by which pure air (in the case of a four-cycle motor) or the products of combustion, mixed or unmixed with pure air, may be withdrawn from the combustion space of the motor, mixed with the fuel, and injected with an admixture of finely divided atomized or vaporized fuel into such combustion space at or near the period of greatest compression therein, under a propelling pressure greater than that existing in such space; to combine such means with a reciprocating motor operating on the four stroke cycle; to furnish an efficient and smoothly operating mechanism of simple character for effecting flow and injection of air and fuel in proper timing with the events of the cycle of the motor; and in general to make such simplifications in the structure and arrangement of parts of a high-compression motor that motors embodying the principles of the invention may be made so small in dimensions and so light in weight as to be easily portable, and therefore adapted for use with locomotive vehicles.

I have described in a companion application for Letters Patent of the United States (Serial Number 259,973, filed October 28, 1918) a scheme for supplying fuel to high compression internal combustion motors, according to which some of the gas remaining in the motor cylinder or combustion chamber after combustion is withdrawn, liquid fuel is mixed with the gas thus withdrawn and is caused by the heat thereof to become vaporized to a degree, and the mixture of gas and fuel is injected into the body of highly compressed air in the clearance space of the motor and ignited by the heat developed by compression. That embodiment of the present invention now about to be described differs from that described in the aforesaid application in two fundamental characteristics; the first of which is that the gas withdrawn from the motor combustion chamber is pure air at low temperature instead of inert products of combustion having a high temperature; and the second is that the means and mechanism provided for effecting the required displacement of air and fuel are substantially different and have characteristics, hereinafter described and pointed out in the claims, by which new results are effected in the manner of such displacement.

The invention consists in the novel means and constructions hereinafter described in detail in connection with one of the possible embodiments thereof, and pointed out in the appended claims. The specific embodiment so illustrated and described, however, is exhibited for the purpose of illustrating the invention and without intent to limit the scope of the protection claimed therefor.

Referring to the drawings forming part of this application, Figure 1 is a longitudinal sectional view through one of the cylinders of a reciprocating internal combustion motor operating on the four stroke cycle and embodying my invention. Figure 2 is is a sectional view on a larger scale than Figure 1 of the fuel mixing chamber and of the check valve in the fuel supply connection. Figure 3 is a cross sectional view of the same chamber on the plane designated by line 3—3 of Figures 1 and 2.

The same reference characters indicate the same parts in all the figures.

I will described the specific motor shown in these drawings and then explain with reference thereto the principles, scope, and utility of the invention. 1 represents the motor cylinder; 2 represents a piston fitting and reciprocating in said cylinder in a manner common to reciprocating motors; 3 represents the crank shaft, shown in dotted lines; 4 is the crank pin which is connected to the shaft 3 by crank arms 5; 6 is the connecting rod extending from the piston, with which it is connected by a wrist pin 7, to the crank pin, being connected to the latter in any common or other desired manner; and 8 represents a crank case which encloses the shaft, the crank, and the connecting rod and other associated parts. The motor cylinder and piston thus described are hereinafter distinguished from another cylinder and piston (about to be described) by the terms "main cylinder" and "main piston," respectively.

9 is the cylinder head in which there is a single large port 10 for both admission of air and outflow of exhausted products of combustion. The head is also formed with admission and exhaust passages 11, 12, respectively, to the latter of which an exhaust pipe 13 is joined. It is to be understood that I may, if desired, couple an air pump or blower of any type, in any desired way to the inlet passage 11 in order to supply air at a pressure higher than existing at the exhaust, or that this inlet passage may be open to the outer atmosphere and the air admitted through it may be drawn in only by the suction of the piston. It is further to be understood that the exhaust pipe 13 may lead to a muffler from which restricted escape occurs, or that the exhaust gases may be discharged without muffling directly to the outer air.

Attention is called to the fact that the exhaust passage, in its beginning part where it adjoins the port 10, is directly in line with the cylinder and with the path in which the exhaust gases are discharged, while the inlet passage has the relation of a branch to the exhaust passage, opening into the latter close to the port and wholly at one side of the path through which the exhaust gases flow. Also the inlet passage makes an abrupt angle with such path. Beyond the inlet passage, the exhaust passage is curved to carry the exhaust gases away from the valve operating mechanism later described, and this curvature is such as to change the direction of flow gradually and without appreciable impediment. As a result of the arrangement thus particularly described, the exhaust gases issuing from the cylinder under their residual pressure, which is generally much higher than atmospheric pressure, flow with great velocity through the exhaust passage and in a path which is not intersected by the mouth of the inlet passage. I have found, in practice, that such flow has an injector action which constantly induces flow of air through the inlet from the outer air, and that there is no tendency for the exhaust gases to pass out of the inlet passage. I have also found that the momentum energy of the exhaust gases and the induced flow of pure air through the inlet cause a scavenging action which completely or mainly clears the combustion space of the spent gases which are not actually displaced by the piston travel during the exhaust stroke. The results just described take place when there is no blower coupled to the inlet and also when the exhaust passage discharges through a muffler.

The port 10 is controlled by a valve 131 having a stem 14 which is fitted to slide in a guide 15 formed in a part of the head. This valve is opened inwardly by a cam 16 on a countershaft 17 through the agency of a sliding rod 18, which bears on the cam, and connected rock arms 19, 20, which bear on this rod and on the valve stem, respectively. Shaft 17 is driven by any suitable means from the main shaft at half the speed of the latter; and the cam is so designed that it opens the valve at the end of each working stroke of the piston, and holds it open during the following suction stroke. The valve is brought back to its seat at the end of the filling or suction stroke of the piston, when the cam 16 has passed out of action, after having opened the valve, by a rock arm 21 having a forked end which enters a groove and engages a shoulder 22 in the valve stem, and is connected with an arm 23 to which a spring 24 is connected. Although the abutment or anchorage for this spring is not shown it is to be understood that the spring is secured at some fixed point on the engine structure or support, and that it constantly tends to seat valve 131.

Beside the main cylinder is a second cylinder 25, hereinafter distinguished as the secondary or auxiliary cylinder, having a head 26, and in which there is a reciprocatable piston 27, hereinafter distinguished as the secondary or auxiliary piston, fitting the auxiliary cylinder in a substantially leakage-tight manner. Said piston 27 is connected by a wrist pin 28 with a link 29 which is connected by a pin 30 to a lever 31 having its fulcrum on a pin 32 which is mounted in a part of the crank case, such part in the construction here shown, being an offset forming an enclosed hollow bracket 33, which opens interiorly into the crank case. Lever 31 is joined by a wrist pin 34 with a link 35 which has a bearing or connection of any suitable character on or with the crank pin 4. Said lever extends across the extended center lines of both cylinders, whereby the location of pin 34 and of the path in which it travels is at the opposite side of such center lines from the fulcrum 32. Also the coupling 30 is between fulcrum 32 and pin 34, which causes the auxiliary piston to travel with the main piston in the same directions at approximately the same times, but with a shorter stroke.

In the head 26 of the secondary cylinder there is formed a transverse passage 36 which opens at one end into a nozzle 37 which passes through the wall between the cylinders and enters the clearance space of the cylinder 1. The clearance space referred to is that part of the cylinder between the head thereof and the broken line 2^b which represents the position of the piston head at the extreme end of its compression stroke. In its embodiment here shown nozzle 37 is a thimble fitting a hole in the intermediate wall 39, wholly open at the end which registers with the passage 36, and having an end wall at the end within the cylinder 1, such end wall and the adjacent sides of the nozzle being intersected by a cut 40 which is so formed and located as to spread, in the form of a fan-shaped jet, the gas outflowing therefrom into the main cylinder.

The end of passage 36 opposite to this nozzle registers with a passage 41 running through a connection 42 which is attached to the secondary cylinder, and in which there is a check valve 43 normally closed by a spring 44 against a seat at the side away from the motor. Fuel is conducted thereto by a conduit 45 from a pump or any other suitable source of supply. The details of the valve, its seat, and the fuel passages are shown in Figure 3, but as I do not make any claim to such details I deem it unnecessary to describe them herein. It is sufficient to say that I have provided in the valve 43 a spring loaded check valve which permits flow of liquid fuel to the motor when the impelling pressure thereon is enough greater than the internal pressure of the motor, and prevents outflow back to the conduit. An intermittently acting pump, such as is commonly used in connection with high compression motors employing the relatively non-volatile fuels, is preferably provided to deliver fuel in measured quantities at given times through the connections thus described. While I have not shown such pump in this drawing, one suitable for use in this combination is illustrated in my companion application Serial No. 259,973 before referred to, to which reference is directed for illustration of the same. Or I may provide the fuel in any suitable container under elastic pressure sufficient to cause flow past the valve to the motor under proper regulation of quantity of the separate charges.

Preferably the passage 36 in the head 26 is cylindrical, or at least its outline in cross section is smoothly curved, and from the passage there are several passageways 46 opening into the interior of cylinder 25. These passageways are preferably tangent to the wall of passage 36 in order that air flowing therethrough into the latter passage may be given a whirling motion. In this way intercommunication is established from the source of fuel supply to the secondary cylinder 25, and between the secondary cylinder and the main cylinder.

The operation of the motor thus described is as follows. During the suction or filling stroke the valve 131 is open and both pistons 2 and 27 are moved at one time away from the heads of their respective cylinders. Air is thereby drawn into both cylinders, flowing first into the main cylinder, and part of it thence through the nozzle 37 and passage 36 and passageways 46 into the auxiliary cylinder, and at the same time a charge of fuel, the amount of which is regulated by the supply means in any desired way, (with automatic government in proportion to the load or not as desired), may be delivered into the passage 36. Such delivery may take place at any time, but preferably occurs soon after the beginning of the suction stroke, when a partial vacuum exists in the auxiliary cylinder. Then the fuel flows through the connecting passages 36 and 46 into the interior of the secondary cylinder while air flows from the main cylinder through the injection nozzle and the same passages, which effects a thorough separation of the fuel into fine particles and a thorough mingling of such particles with air. At the end of the suction stroke the pistons are reversed in direction of movement, and perform their compression stroke nearly simultaneously, but at different rates of acceleration, the main piston at first traveling faster than the auxiliary piston and forcing more air into the auxiliary cylinder, with further atomization; and as the compression increases heat is generated, which aids to vaporize the fuel. When the primary piston is near the end of the compression stroke, the mixture of air and fuel in the secondary cylinder is forced through the nozzle into the main cylinder, and the fuel is ignited by the high temperature of the compressed air in the clearance space of that cylinder. Combustion of the fuel charge thus takes place and continues as long as the mixture continues to flow from the secondary cylinder. The balance of the cycle, consisting of the working and exhaust strokes, is substantially the same as in any four stroke cycle internal combustion motors, except as modified by the work done by and with the secondary piston.

In this operation the fuel is not injected into the main cylinder until the compression therein is approximately at the maximum and the piston is almost at the end of its stroke, the crank being then within a few degrees of the upper dead center; but at that time the secondary piston develops a higher pressure in the gas upon which it acts, than that in the main cylinder. I accomplish this result by causing the secondary piston to travel relatively slower than the main piston during the first and greater part of the compression stroke, and relatively faster during the balance of the stroke; and by so arranging the secondary piston that there is the least possible clearance between it and the head of the secondary cylinder, while a substantial clearance is provided in the head end of the main cylinder. Reference is directed to the broken line diagram in Figure 1 in further explanation of the manner of these movements. In this diagram the point 4ᵃ represents the position of the crank pin when 30° in advance of the upper dead center. The line 6ᵃ shows the position of the connecting rod at that time, and line 2ᵃ the corresponding position of the head of piston 2. Connecting link 35 then is in the position designated by the line 35ᵃ, the coupling pin 34 is in the position 34ᵃ, lever 31 is in the position 31ᵃ and wrist pin 30 in the position 30ᵃ, and the head of the secondary piston is at the location designated by the broken line 27ᵃ. Owing to the fact that in this position the crank 4 and the coupling pin 34 are on respectively opposite sides of the center line of the motor, the obliquity of the connecting link 35 to the path of pin 34 is greater than the obliquity of connecting rod 6ᵃ to the path of the main piston, wherefore it is evident that the lever 31 has accomplished a smaller proportion of its stroke than the main piston has accomplished; and that the secondary piston, the movement of which is approximately proportional to the movement of pin 34, has traveled a less proportion in its stroke than the main piston. Thereafter while the pins 34 and 30 are moving to the points 34ᵇ and 30ᵇ, respectively, which carries the piston 27 up to the head 26 with substantially no clearance, the main piston travels only from the position 2ᵃ to 2ᵇ, a distance which is not only proportionally but actually less than the travel of piston 27 in the same time, and commences to return on the working stroke. As long as the compression pressure in the main cylinder is greater than that in the secondary cylinder, air flows from the main cylinder to the secondary cylinder, but after the point is reached where the relatively increasing speed of the secondary piston and its approach to the cylinder head has caused the pressure to be higher in the secondary cylinder, flow takes place in the opposite direction and fuel injection commences. By appropriately designing the mechanism, placing the fulcrum pin 32 at a greater or less height with respect to the main shaft, locating the path of the coupling pin 34 nearer to or farther from the center line and making the connecting link 35 longer or shorter, the exact point at which reversal of relative speeds occurs and the point at which fuel injection ends may be varied; while by virtue of the large volume of the main piston displacement and the restricted area of the nozzle orifice 40 through which exclusively all flow of air from one cylinder to the other takes place, equalization of the pressures in the two cylinders while the main piston travels relatively faster is prevented. In the particular design here shown, which gives satisfactory results, the pressure in the secondary cylinder becomes the greater when the crank pin is about 15° in advance of the dead center, and rapidly increases until the secondary piston has reached the end of its stroke, when the crank has gone about 5° past the dead center. This, then, is the period when fuel admission and combustion occurs, viz: from about 15° before to about 5° after the dead point of the crank, which is the most effective time for smooth running and efficient conversion of heat energy into mechanical work. The positive manner in which the secondary piston is actuated and its lack of clearance, causes it to inject all of the fuel in the secondary cylinder; while the character of its actuating mechanism causes it to be moved smoothly, evenly, without backlash, and with gradual acceleration and retardation.

Although I prefer, as previously stated, to have the fuel delivered into the passage 36 during the suction stroke, yet it may be delivered at other times; and if its admission should not take place until during the compression stroke, the motor will still operate because the air then displaced from the secondary cylinder will circulate around the passage 36 with the spiral motion and carry all fuel therein to the main cylinder.

I have made provisions for water cooling the walls of the main and auxiliary cylinders, such provisions being represented by the water jackets 48, 49; the circulating connections or pump for causing circulation of the cooling water, however, not being shown because I may use any means for the purpose already known or which may be devised. Neither is any means shown for cooling the head of the auxiliary cylinder, and in fact I prefer not to cool it, but to make it of massive construction so that it will retain heat and so assist to vaporize the fuel. Thus the delivered fuel charges are highly heated at once, and thereby put in condition to evaporate and mix quickly with the air which is drawn in by the suction stroke of the auxiliary piston. But there is no liability of premature ignition of the fuel, because during the filling stroke the incoming air is cool; while on the compression stroke, the pressure is not raised to the temperature of ignition until the main piston has nearly completed the stroke, or in other words has reached approximately the point at which it is desired that injection of fuel and combustion in the main cylinder should begin.

The motor is simple in design and operation, with few parts. It does away with the complicated mechanism which is found with engines of the Diesel type having a separate compressor and storage tank for injection air, and with the expenditure of energy necessary for operation thereof; and it avoids the serious disadvantage of chilling the fuel charge because, as the injection air is hot as well as under high pressure, it does not become chilled as the result of expansion when entering the combustion cylinder. Thus my motor will start more readily than those of the Diesel type.

Only one single valve is required to control both the admission to and exhaust from the main cylinder conducing to simplicity and small number of operating parts. Then the arrangement by which the secondary cylinder is close beside and parallel to the main cylinder, there being a common wall between them, leads to the same end, and permits manufacture with high economy of material and in the finishing operations.

Evidently the unit here shown and described may be duplicated and combined with like units to make a motor having any desired number of cylinders; and when thus combined, all of the cylinders, main and secondary, can be cast in a single block. Such duplication or multiplication herein contemplated extends to all the parts described with the exception of the crank shaft 3 and cam shaft 17, which are common to all cylinders. This characteristic of simplicity and compactness adapts the motor for uses where relatively small bulk and weight and low cost are important, as for instance in tractors, trucks, and other motor vehicles. In fact the particular motor illustrated is one of the units of a four cylinder motor designed particularly for use in small farm tractors.

The principles of the invention may, however, be applied in various diverse forms, and in various dimensions and proportions, wherefore except as it appears from the following claims themselves, I do not restrict my protection for the fundamental features of this invention to the precise design shown, or to one operating on the four-stroke rather than the two-stroke cycle, for these principles and identical constructions (except for well understood modifications in parts) are equally applicable to two-cycle motors, or even to a motor of the reciprocating type; and of course no restriction is to be implied from the fact that the illustration shows the motor upright with the cylinder above the shaft, rather than in an inverted, recumbent or inclined position. In reference particularly to the secondary or auxiliary cylinder and its piston, I would point out that this cylinder is essentially a chamber for reception of injection air, which may have any form or be located in any position without departure from the broad principles of the invention; and that the secondary piston is a movable wall of such chamber, and also a displacer for the contents thereof, by which the internal volume of the chamber is enlarged and reduced at times and in extent necessary to effect the desired results. Any other constructions complying with this definition are to be construed as equivalent to the secondary cylinder and piston here described.

What I claim and desire to secure by Letters Patent is:

1. The combination with an internal combustion motor having a cylinder, piston, connecting rod and crank, of an auxiliary cylinder beside the main cylinder and having communication therewith, an auxiliary piston operating therein, a pivoted rock lever, a link connecting said rock lever with said auxiliary piston and a link connecting the rock lever with the crank, the connection between said lever and the last named link being at the opposite side of the center line of the main cylinder from the crank during the compression strokes of the pistons.

2. In an internal combustion motor the combination with a main cylinder, of an auxiliary cylinder beside the main cylinder and having a massive head, a crosswise passage in said head, an injection nozzle running from one end of said passage into the main cylinder and having a discharge orifice in the latter, passageways running from said passage and opening into the interior of the auxiliary cylinder, means for conducting liquid fuel to the passage, and a piston operating in the auxiliary cylinder and driven with a given timing to draw air through said passage into the auxiliary chamber during the filling stroke, and to return such air mixed with fuel into the main cylinder at the end of the compression stroke in the latter.

3. In an internal combustion motor the combination with a main cylinder, of an auxiliary cylinder beside the main cylinder and having a massive head, a crosswise passage in said head, an injection nozzle running from one end of said passage into the main cylinder and having a discharge orifice in the latter, and passageways running from said passage and opening into the interior of the auxiliary cylinder, said passage having a curved outline in cross section, and said passageways being substantially tangent to such curved outline, whereby air flowing from the passageways into the passage is given a whirling motion in the latter.

4. In an internal combustion motor, a mixing chamber having a head, a cross passage in said head, means for delivering liquid fuel in one end of said passage, a nozzle communicating with the opposite end of said passage and having a jet orifice, said nozzle being formed as a thimble arranged with its open end in register with said passage, and having in its opposite end wall and in the sides adjacent thereto, a slot forming an injection orifice.

5. In an internal combustion motor, a mixing chamber having a head, a cross passage in said head, means for delivering liquid fuel in one end of said passage, a nozzle communicating with the opposite end of said passage and having a jet orifice, said passage having a curved outline in cross section, and the passageways being substantially tangent to such outline.

6. An internal combustion motor comprising a main cylinder and a secondary-cylinder arranged substantially parallel to one another with intermediate communication for flow of air, a main piston and a secondary piston working in said cylinders respectively, a crank, a connecting rod between said crank and the main piston, a lever, a link joining said lever to the secondary piston, and a second link joining the crank to said lever at a point which is on the opposite side of the center line of the main cylinder from the path in which the crank travels during the compression stroke.

7. An internal combustion motor comprising a main cylinder and a secondary cylinder arranged substantially parallel to one another with intermediate communication for flow of air, a main piston and a secondary piston working in said cylinders respectively, a crank, a connecting rod between said crank and the main piston, a lever pivotally mounted at a point on the opposite side of the secondary cylinder from the main cylinder, a link joining said lever and the secondary piston, and a second link joining the crank to the lever at a point on the opposite side of the center line of the main cylinder from the pivot of said lever.

8. An internal combustion motor comprising a main cylinder and a secondary cylinder arranged substantially parallel to one another with intermediate communication for flow of air, a main piston and a secondary piston working in said cylinders respectively, a crank, a connecting rod between said crank and the main piston, a lever pivotally mounted at a point on the opposite side of the secondary cylinder from the main cylinder, a link connected to said crank and to the lever at a point at the opposite side of the center line of the main cylinder from the pivot, and a link joined to the secondary piston and to an intermediate point on the lever.

9. An internal combustion motor comprising a main cylinder, an auxiliary cylinder in communication with the main cylinder at the head ends of both, such communication being through a passage extending across the end of the auxiliary cylinder and having a number of branches opening into the latter, pistons working in both cylinders and connected to make their suction and compression strokes at substantially the same times, and means for delivering liquid fuel into said passage, the piston in the auxiliary cylinder causing air to flow through said passage with agitation and atomization of the liquid fuel.

In testimony whereof I have affixed my signature.

EUGENE A. FORD.